United States Patent
Ono

(10) Patent No.: US 7,149,932 B2
(45) Date of Patent: Dec. 12, 2006

(54) SERIAL COMMUNICATION DEVICE AND METHOD OF CARRYING OUT SERIAL COMMUNICATION

(75) Inventor: Kazuya Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 492 days.

(21) Appl. No.: 09/973,795

(22) Filed: Oct. 11, 2001

(65) Prior Publication Data

US 2002/0046366 A1 Apr. 18, 2002

(30) Foreign Application Priority Data

Oct. 11, 2000 (JP) ............................. 2000-310113

(51) Int. Cl.
*G06F 11/00* (2006.01)

(52) U.S. Cl. .................. 714/43; 710/71; 714/751; 714/752; 714/757; 714/772; 714/801

(58) Field of Classification Search .................. 714/43, 714/772, 751, 752, 757, 801; 710/71
See application file for complete search history.

(56) References Cited

U.S. PATENT DOCUMENTS

| | | | | |
|---|---|---|---|---|
| 4,110,558 A | * | 8/1978 | Kageyama et al. | 375/357 |
| 4,171,765 A | * | 10/1979 | Lemone | 714/719 |
| 4,218,742 A | * | 8/1980 | Carlton et al. | 710/71 |
| 4,450,561 A | * | 5/1984 | Gotze et al. | 714/757 |
| 4,622,670 A | * | 11/1986 | Martin | 714/786 |
| 4,797,625 A | | 1/1989 | Nakazawa | |
| 5,077,656 A | * | 12/1991 | Waldron et al. | 710/305 |
| 5,357,531 A | * | 10/1994 | Tanaka | 714/800 |
| 5,946,327 A | * | 8/1999 | Murphy | 370/517 |
| 6,804,805 B1 | * | 10/2004 | Rub | 714/752 |
| 6,848,042 B1 | * | 1/2005 | Campbell et al. | 712/35 |
| 6,941,418 B1 | * | 9/2005 | Goolsby | 711/109 |

FOREIGN PATENT DOCUMENTS

| | | |
|---|---|---|
| JP | 1-187657 | 7/1989 |
| JP | 3-46243 | 4/1991 |
| JP | 3-118629 | 5/1991 |
| JP | 5-260125 | 10/1993 |
| JP | 7-219631 | 8/1995 |
| JP | 10-11390 | 1/1998 |
| JP | 10-49984 | 2/1998 |
| JP | 2971006 | 8/1999 |
| WO | WO 88/06384 | 8/1988 |

* cited by examiner

*Primary Examiner*—Michael Maskulinski
(74) *Attorney, Agent, or Firm*—Young & Thompson

(57) ABSTRACT

A serial communication device bridging between a parallel bus and a serial bus, includes (a) a check bit producer which applies an error correcting code to parallel data transmitted through the parallel bus, (b) a parallel-serial converter which converts the parallel data output from the check bit producer, into serial data, (c) a serial-parallel converter which converts serial data transmitted through the serial bus, into parallel data, and (d) an error detector which checks an error correcting code applied to the serial data, and detects an error in the error correcting code.

22 Claims, 3 Drawing Sheets

C : COMMAND
A : ADRESS
D : DATA
ECC : ERROR CORRECTING CODE

SERIAL COMMUNICATION DEVICE AND METHOD OF CARRYING OUT SERIAL COMMUNICATION

BACKGROUND OF THE INVENTION

1. Field of the Invention

The invention relates to a serial communication device and a method of carrying out serial communication both used for confounding a memory in duplex, and more particularly to such a serial communication device and a method of carrying out serial communication both presenting the same reliability as reliability presented by a parallel bus.

2. Description of the Related Art

FIG. 1 is a block diagram of a conventional system for making communication in duplex confounding.

The system is comprised of a first parallel bus controller 10, a second parallel bus controller 12, a first buffer circuit 11a associated with the first parallel bus controller 10 and electrically connected between the first and second parallel bus controllers 10 and 12, a second buffer circuit 11b associated with the second parallel bus controller 12 and electrically connected between the first buffer circuit 11a and the second parallel bus controller 12, a 32-bit address bus 13, a 32-bit data bus 14, and a 5-bit parity 15.

The 32-bit address bus 13, the 32-bit data bus 14 and the 5-bit parity 15 are all electrically connected between the first and second parallel bus controllers 10 and 12 through the first and second buffer circuits 11a and 11b.

Communication in duplex confounding between the first and second parallel bus controllers 10 and 12 is made through the 32-bit address bus 13 and the 32-bit data bus 14.

Errors in parallel buses, that is, in the 32-bit address bus 13 and the 32-bit data bus 14 are detected through the 5-bit parity 15.

The above-mentioned conventional system illustrated in FIG. 1 is accompanied with a problem that since the system has to include a lot of signal line for the parallel buses, the system unavoidably has a plurality of buffer circuits 11a and 11b, resulting in much defectiveness in fabrication of the system and high cost for fabricating the system.

It would be possible to accomplish reduction in both cost and defectiveness in fabrication of the system, if the parallel buses are replaced with serial buses. However, the use of serial bus causes another problem that bit errors occur during communication, and hence, it is impossible to ensure the same reliability as reliability obtained when parallel buses are used.

Japanese Patent No. 2971006 (Japanese Unexamined Patent Publication No. 8-265393) has suggested a method of carrying out serial communication in a serial communication controller including at least one first buffer for receiving data and at least one second buffer for transmitting data. In the method, the first buffer is used for receiving data and the second buffer is used for transmitting data when data is received and transmitted in full-duplex communication. The first and second buffers are used only for receiving data when data is received in half-duplex communication. The first and second buffers are used only for transmitting data when data is transmitted in half-duplex communication.

However, the above-mentioned problems remain unsolved even in the method suggested in the above-mentioned Publication.

SUMMARY OF THE INVENTION

In view of the above-mentioned problems in the conventional system, it is an object of the present invention to provide a serial communication device and a method of carrying out serial communication both of which are capable of reducing the number of parts to thereby accomplish reduction in cost and defectiveness in fabrication, and providing the same reliability as reliability obtained when parallel buses are used, even though serial buses are used in place of parallel buses.

In one aspect of the present invention, there is provided a serial communication device bridging between a parallel bus and a serial bus, including (a) a check bit producer which applies an error correcting code to parallel data transmitted through the parallel bus, and (b) a parallel-serial converter which converts the parallel data output from the check bit producer, into serial data.

The serial communication may further include a parallel bus interface circuit which multiplexes the parallel data transmitted through the parallel bus, in predetermined bits, and outputs the thus multiplexed parallel data to the check bit producer, in which case, the parallel-serial converter converts the parallel data into serial data every the predetermined bits, and the check bit producer applies the error correcting code to every the predetermined bits of the parallel data.

There is further provided a serial communication device bridging between a parallel bus and a serial bus, including (a) a serial-parallel converter which converts serial data transmitted through the serial bus, into parallel data, and (b) an error detector which checks an error correcting code applied to the serial data, and detects an error in the error correcting code.

It is preferable that the error detector has a function of correcting the error when the error is detected by the error detector.

It is preferable that the error detector corrects the error when the error is a 1-bit error, and abandons an access when the error is a 2-bit error.

There is still further provided a serial communication device bridging between a parallel bus and a serial bus, includes (a) a check bit producer which applies an error correcting code to parallel data transmitted through the parallel bus, (b) a parallel-serial converter which converts the parallel data output from the check bit producer, into serial data, (c) a serial-parallel converter which converts serial data transmitted through the serial bus, into parallel data, and (d) an error detector which checks an error correcting code applied to the serial data, and detects an error in the error correcting code.

The serial communication device may further include a parallel bus interface circuit which (a) multiplexes the parallel data transmitted through the parallel bus, in predetermined bits, and outputs the thus multiplexed parallel data to the check bit producer, and (b) receives parallel data from the error detector, and outputs the received parallel data to the parallel bus, in which case, the parallel-serial converter converts the parallel data into serial data every the predetermined bits, and the check bit producer applies the error correcting code to every the predetermined bits of the parallel data.

In another aspect of the present invention, there is provided a method of carrying out serial communication between a parallel bus and a serial bus, including the steps of (a) applying an error correcting code to parallel data transmitted through the parallel bus, and (b) converting the parallel data into serial data.

The method may further include the step of (c) multiplexing the parallel data transmitted through the parallel bus, in predetermined bits, the step (c) being to be carried out prior to the step (a), in which case, the parallel data is converted into serial data every the predetermined bits in the step (b), and the error correcting code is applied to every the predetermined bits of the parallel data in the step (a).

There is further provided a method of carrying out serial communication between a parallel bus and a serial bus, including the steps of (a) converting serial data into parallel data, (b) checking an error correcting code applied to the serial data, and (c) detecting an error in the error correcting code.

The method may further include the step of (d) correcting the error detected in the step (c).

The method may further include the steps of (d) correcting the error when the error is a 1-bit error, and (e) abandoning an access when the error is a 2-bit error.

There is still further provided a method of carrying out serial communication between a parallel bus and a serial bus, including the steps of (a) applying an error correcting code to parallel data transmitted through the parallel bus, (b) converting the parallel data into serial data, (c) converting serial data transmitted through the serial bus, into parallel data, (d) checks an error correcting code applied to the serial data, and (e) detecting an error in the error correcting code.

The advantages obtained by the aforementioned present invention will be described hereinbelow.

In accordance with the present invention, the number of parts for constituting the communication system can be reduced to thereby accomplish reduction in cost and defectiveness in fabrication of the communication system, and the same reliability as reliability obtained when parallel buses are used can be provided, even though serial buses are used in place of parallel buses.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
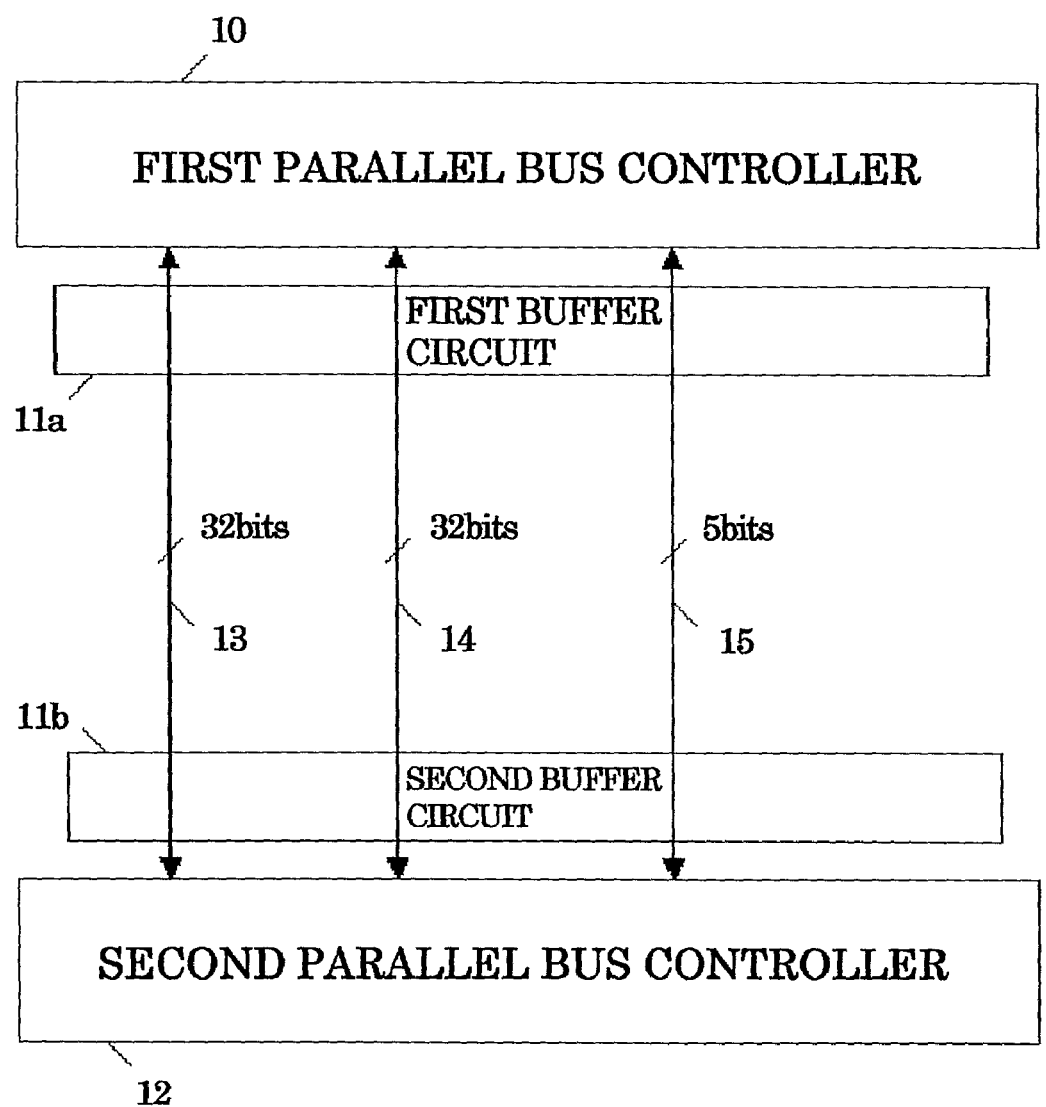
FIG. 1 is a block diagram of a conventional system for making communication in duplex confounding.
Figure 2:
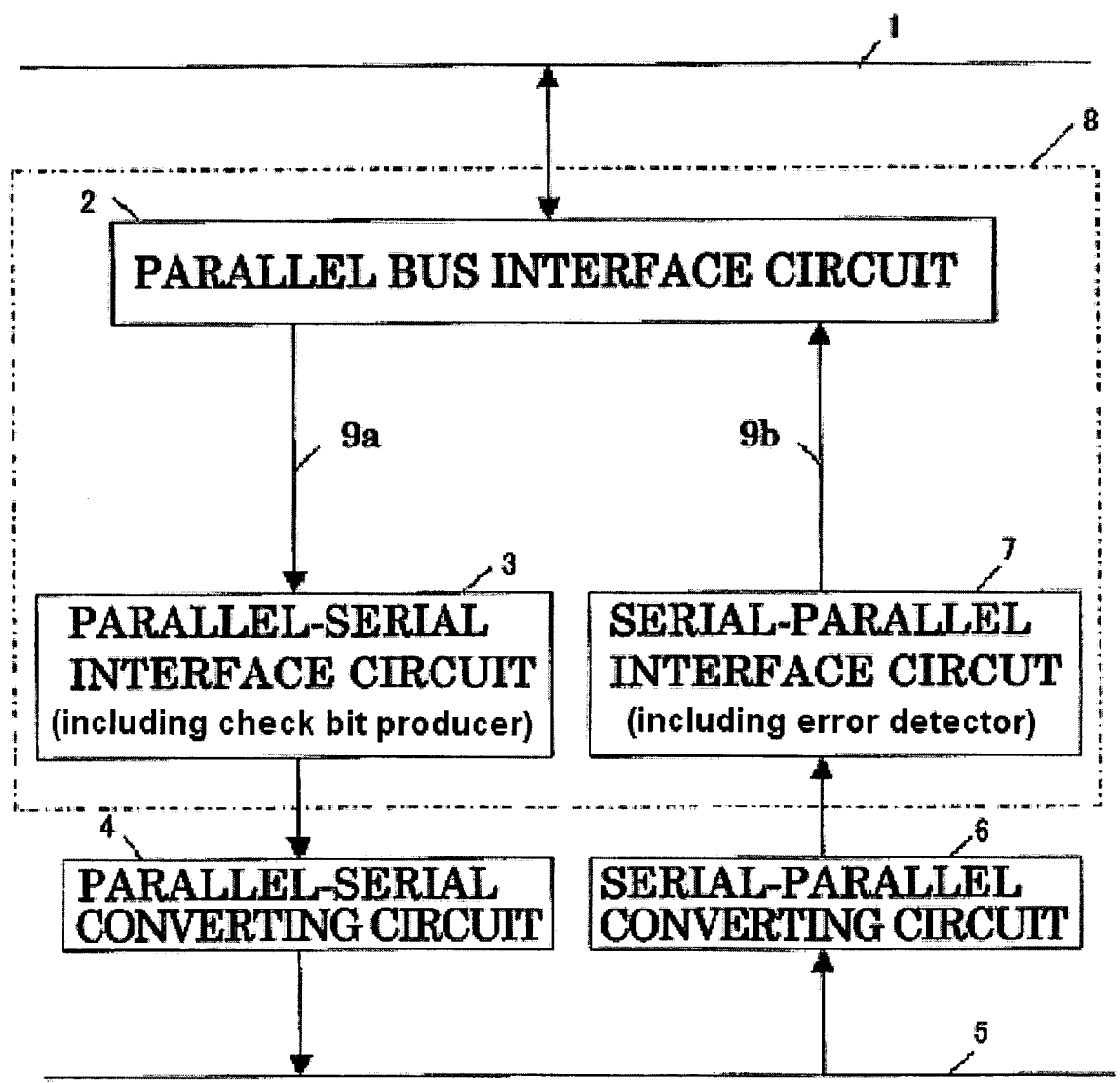
FIG. 2 is a block diagram of the serial communication device in accordance with a preferred embodiment of the present invention.

FIG. 2 is a block diagram of the serial communication device in accordance with a preferred embodiment of the present invention.

The serial communication device is comprised of a bus bridge circuit 8 electrically connected to a parallel bus 1 including a 32-bit address bus and a 32-bit data bus, a parallel-serial converting circuit 4 electrically connected between the bus bridge circuit 8 and a serial bus 5, and a serial-parallel converting circuit 6 electrically connected between the bus bridge circuit 8 and the serial bus 5.

The bus bridge circuit 8 is comprised of a parallel bus interface circuit 2 electrically connected to the parallel bus 1, a parallel-serial interface circuit 3 electrically connected between the parallel bus interface circuit 2 and the parallel-serial converting circuit 4, a serial-parallel interface circuit 7 electrically connected between the parallel bus interface circuit 2 and the serial-parallel converting circuit 6, a first 8-bit data-multiplexing bus 9a electrically connecting the parallel bus interface circuit 2 and the parallel-serial interface circuit 3 to each other, and a second 8-bit data-multiplexing bus 9b electrically connecting the parallel bus interface circuit 2 and the serial-parallel interface circuit 7 to each other.

The parallel and serial buses 1 and 5 may have any structure.

The parallel bus interface circuit 2 act as an interface to the parallel bus 1. When data is transmitted to the serial bus 5 from the parallel bus 1, the parallel bus interface circuit 2 multiplexes 32-bit address, data and command transmitted through the parallel bus 1, into 8-bit (1 byte) addresses, data and commands, and outputs the thus multiplexed addresses, data and commands to the parallel-serial interface circuit 3 through the first 8-bit data-multiplexing bus 9a. When data is transmitted to the parallel bus 1 from the serial bus 5, the parallel bus interface circuit 2 transmits data multiplexed into 1-byte data, to the parallel bus 1 as 32-bit address, data and command.

The parallel-serial interface circuit 3 acts as an interface for transmitting serial data, and produces a bit for checking an error correcting code in serial communication (hereinafter, such a bit is referred to as "ECC check bit"). The parallel-serial interface circuit 3 receives address, data and command byte by byte from the parallel bus interface circuit 2, produces a ECC check bit on receipt of 1-byte of address, data and command, applies the thus produced ECC check bit to each 1-byte of address, data and command, and outputs each 1-byte of address, data and command with the associated ECC check bit, to the parallel-serial converting circuit 4.

The parallel-serial converting circuit 4 receives the parallel data byte by byte from the parallel-serial interface circuit 3, converts the received parallel data to serial data, and outputs the thus converted serial data to the serial bus 5.

The serial-parallel converting circuit 6 receives serial data through the serial bus 5, converts the received serial data to parallel data byte by byte, and outputs the thus converted parallel data to the serial-parallel interface circuit 7.

The serial-parallel interface circuit 7 detects a ECC check bit, corrects errors in error correcting codes, and acts as an interface for transmitting parallel data. Specifically, the serial-parallel interface circuit 7 checks ECC check bits in address, data and command to thereby detect errors in error correcting codes, and corrects the detected errors. Then, the serial-parallel interface circuit 7 converts 1-byte data transmitted from the serial-parallel converting circuit 6, into 32-bit address, data and command, and multiplexes the 32-bit address, data and command into 8-bit (1 byte) addresses, data and commands, and outputs the thus multiplexed addresses, data and commands to the parallel bus interface circuit 2 through the second 8-bit data-multiplexing bus 9b.

The serial-parallel interface circuit 7 checks the ECC check bits in address, data and command to thereby detect errors in the error correcting codes. If the serial-parallel interface circuit 7 detects a 1-bit error in the error correcting codes, the serial-parallel interface circuit 7 corrects the detected 1-bit error, whereas if the serial-parallel interface circuit 7 detects a 2-bit error in the error correcting code, the serial-parallel interface circuit 7 abandons an access associated the detected error.

Figure 3:
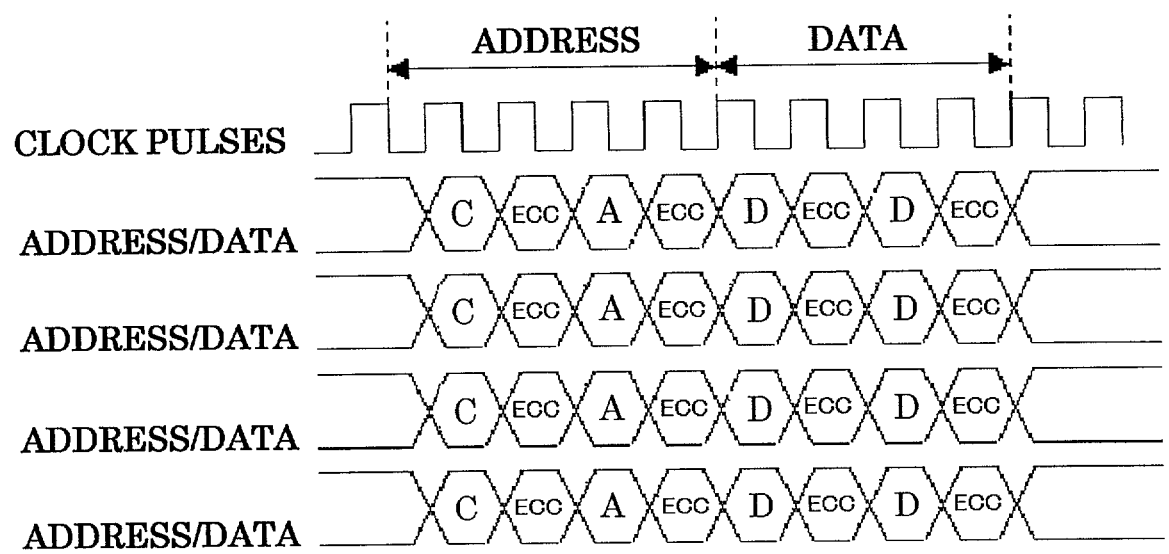
FIG. 3 is a time chart showing an operation of the serial communication device illustrated in FIG. 1.

FIG. 3 is a time chart showing a relation among addresses, data, commands and ECC check bits.

Hereinbelow is explained an operation of the serial communication device in accordance with the embodiment.

When data is transmitted to the serial bus 5 from the parallel bus 1, the parallel bus interface circuit 2 multiplexes 32-bit address, data and command transmitted through the parallel bus 1, into 8-bit (1 byte) addresses, data and commands, and outputs the thus multiplexed addresses, data and commands to the parallel-serial interface circuit 3 through the first 8-bit data-multiplexing bus 9a.

The parallel-serial interface circuit 3 receives address, data and command byte by byte from the parallel bus interface circuit 2, produces a ECC check bit on receipt of 1-byte of address, data and command, applies the thus produced ECC check bit to each 1-byte of address, data and command, and outputs each 1-byte of address, data and command with the associated ECC check bit, to the parallel-serial converting circuit 4.

The parallel-serial converting circuit 4 receives the parallel data byte by byte from the parallel-serial interface circuit 3, converts the received parallel data to serial data, and outputs the thus converted serial data to the serial bus 5.

When data is transmitted to the parallel bus 1 from the serial bus 5, address, data and command are transmitted to the serial-parallel converting circuit 6 through the serial bus 5, and are converted into parallel data in 1-byte in the serial-parallel converting circuit 6. The thus converted 1-byte parallel data are transmitted to the serial-parallel interface circuit 7.

The serial-parallel interface circuit 7 converts the 1-byte serial data transmitted from the serial-parallel converting circuit 6, into 32-bit address, data and command, and multiplexes the 32-bit address, data and command into 8-bit (1 byte) addresses, data and commands, and outputs the thus multiplexed addresses, data and commands to the parallel bus interface circuit 2 through the second 8-bit data-multiplexing bus 9b.

In addition, the serial-parallel interface circuit 7 checks the ECC check bits in address, data and command to thereby detect errors in the error correcting codes. If the serial-parallel interface circuit 7 detects a 1-bit error in the error correcting codes, the serial-parallel interface circuit 7 corrects the detected 1-bit error. If the serial-parallel interface circuit 7 detects a 2-bit error in the error correcting code, the serial-parallel interface circuit 7 abandons an access associated the detected error.

The 32-bit address, data and command are transmitted to the parallel bus interface circuit 2 from the serial-parallel interface circuit 7, and then, transferred to the parallel bus 1 through the parallel bus interface circuit 2.

The parallel-serial interface circuit 3 produces the ECC check bits for address, data and command, and applies the ECC check bits to each 1-byte of address, data and command at timings illustrated in FIG. 3 in accordance with clock pulses.

Similarly, the serial-parallel interface circuit 7 checks the ECC check bits in address, data and command at timings illustrated in FIG. 3 in accordance with clock pulses.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-310113 filed on Oct. 11, 2000 including specification, claims, drawings and summary is incorporated herein by reference in its entirety.

What is claimed is:

1. A serial communication device bridging between an m bit parallel bus and a serial bus, comprising:
   a parallel bus interface circuit that receives as an input m bit wide data from the parallel bus and multiplexes the m bit wide data into sequentially generated n bit wide parallel data segments, with n<m;
   a check bit producer that receives as an input the n bit wide parallel data segments and produces as an output a parallel arrangement of the n bit wide parallel data segments and a generated error correcting code; and
   a parallel-serial converter which converts said parallel arrangement of the n bit wide parallel data segments and the error correcting code from said check bit producer into serial data.

2. The device of claim 1, wherein m=32 and n=8.

3. A serial communication device bridging between a parallel bus and a serial bus, comprising:
   a serial-parallel converter which converts serial data with an error correcting code transmitted through said serial bus into parallel arrangement of n bit wide parallel data segments and the error correcting code;
   an error detector which checks the error correcting code within said parallel data; and
   a parallel bus interface circuit that demultiplexes the n bit wide parallel data segments from the error detector into m bit wide parallel data on the parallel bus, where m>n.

4. The serial communication device as set forth in claim 3, wherein said error detector has a function of correcting said error when said error is detected by said error detector.

5. The serial communication device as set forth in claim 4, wherein said error detector corrects said error when said error is a 1-bit error, and abandons an access when said error is a 2-bit error.

6. The device of claim 3, wherein m=32 and n=8.

7. A serial communication device bridging between a parallel bus and a serial bus, comprising:
   a parallel bus interface circuit that receives as an input m bit wide data from the parallel bus and multiplexes the m bit wide data into sequentially generated n bit wide parallel data segments, with n<m;
   a check bit producer that receives as an input the n bit wide parallel data segments and produces as an output a parallel arrangement of the n bit wide parallel data segments and a generated error correcting code;
   a parallel-serial converter which converts said parallel arrangement of the n bit wide parallel data segments and the error correcting code from said check bit producer into serial data;
   a serial-parallel converter which converts serial data with the error correcting code transmitted through said serial bus into parallel arrangement of the n bit wide parallel data segments and the error correcting code; and
   an error detector which checks the error correcting code within said parallel data;
   wherein the parallel bus interface is also connected to receive as an input the parallel data segments from the error detector, the parallel bus interface demultiplexing the n bit wide parallel data segments from the error detector into m bit wide parallel data on the parallel bus.

8. The serial communication device as set forth in claim 7, wherein said error detector has a function of correcting said error when said error is detected by said error detector.

9. The serial communication device as set forth in claim 7, wherein said error detector corrects said error when said error is a 1-bit error, and abandons an access when said error is a 2-bit error.

10. The device of claim 7, wherein m=32 and n=8.

11. The device of claim 7, wherein data that is transferred from the parallel bus interface circuit to the check bit producer travels along a different path than does data that is transferred from the error detector to the parallel bus interface circuit.

12. A method of carrying out serial communication between a parallel bus and a serial bus, comprising the steps of:
  multiplexing m bit wide parallel data sequentially into n bit wide parallel data segments, where m>n;
  applying an error correcting code to each n bit wide parallel data segment; and
  converting said parallel data with the error correcting code into serial data.

13. The method of claim 12, wherein m=32 and n=8.

14. A method of carrying out serial communication between a parallel bus and a serial bus, comprising the steps of:
  converting serial data with an included error correcting code into parallel arrangement of n bit wide parallel data segments and the error correcting code;
  checking the error correcting code applied to each said parallel data segment;
  checking for an error based on said error correcting code; and
  demultiplexing the n bit wide parallel data segments into m bit wide parallel data on the parallel bus, wherein m>n.

15. The method as set forth in claim 14, further comprising the step of correcting said error detected in said error checking step.

16. The method as set forth in claim 14, further comprising the steps of:
  (d) correcting said error when said error is a 1-bit error; and
  (e) abandoning an access when said error is a 2-bit error.

17. The method of claim 14, wherein m=32 and n =8.

18. A method of carrying out serial communication between a parallel bus and a serial bus, comprising the steps of:
  when transferring data from the parallel bus to the serial bus:
  multiplexing m bit wide parallel data from the parallel bus into n bit wide data segments, where m>n;
  applying an error correcting code to each parallel data segment; and
  converting each said parallel data segment with the error code into serial data; and
  when transferring data from the serial bus to the parallel bus:
  converting serial data with included error codes transmitted through said serial bus into parallel arrangement of the n bit wide parallel data segments and the error correcting code;
  checking the error correcting code applied to each said parallel data segment;
  detecting an error in said error correcting code; and
  demultiplexing the n bit wide parallel data segments into m bit wide parallel data on the parallel bus.

19. The method as set forth in claim 18, further comprising the step of correcting said error detected in said error detecting step.

20. The method as set forth in claim 18, further comprising the steps of:
  (f) correcting said error when said error is a 1-bit error; and
  (g) abandoning an access when said error is a 2-bit error.

21. The method of claim 18, wherein m=32 and n=8.

22. The method of claim 18, wherein the n bit wide data segments transferred while communicating from the parallel bus to the serial bus follow a different path than that used to transfer the n bit wide data segments while communicating from the serial bus to the parallel bus.

* * * * *